United States Patent [19]
Jollie

[11] Patent Number: 5,819,468
[45] Date of Patent: Oct. 13, 1998

[54] TREE TRUNK PROTECTOR

[76] Inventor: James J. Jollie, 15104 NE. 50th St., Vancouver, Wash. 98682

[21] Appl. No.: 852,337

[22] Filed: May 7, 1997

[51] Int. Cl.$^6$ .......................... A01G 13/10; A01G 17/00
[52] U.S. Cl. .................................. 47/23; 47/30; 52/170; 52/515
[58] Field of Search .................................. 47/23, 30, 24, 47/26, 21; 52/515, 170, 723.1, 723.2, 736.3, 737.5, 737.4, 738.1, 736.4

[56] References Cited

U.S. PATENT DOCUMENTS

| | | |
|---|---|---|
| 44,131 | 9/1864 | Whitlock . |
| 404,757 | 6/1889 | Webber .......................... 47/23 |
| 494,874 | 4/1893 | Majola . |
| 574,998 | 1/1897 | Kent et al. . |
| 1,075,255 | 10/1913 | Helm ............................ 47/23 |
| 1,596,657 | 8/1926 | Heber ........................... 52/170 |
| 2,006,562 | 7/1935 | Scheu . |
| 2,413,487 | 12/1946 | Dockry .......................... 47/23 |
| 4,268,992 | 5/1981 | Scharf, Sr. ..................... 47/23 |
| 4,922,652 | 5/1990 | Graves .......................... 47/23 |
| 4,991,367 | 2/1991 | McGinnis ....................... 52/170 |
| 5,044,815 | 9/1991 | Wright .......................... 47/23 |
| 5,048,229 | 9/1991 | Campbell ....................... 47/24 |

Primary Examiner—Michael J. Carone
Assistant Examiner—Joanne C. Downs
Attorney, Agent, or Firm—Chernoff, Vilhauer, McClung & Stenzel, LLP

[57] ABSTRACT

A tree trunk protector includes a pair of elongate upright members, each of which has opposing end portions. Each of the upright members defines a pair of upright edges such that respective pairs of the upright edges are engageable with one another to form an elongate opening suitable to surround the lower portion of the tree and the elongate opening is substantially the same size along the length of the upright members. Each end portion of each of the upright members defines a respective integral flange that includes a pair of faces where respective pairs of the faces are in face to face abutment when the upright edges are engaged with one another. Each of the faces of the integral flanges define a projection and a hole located such that the projection of one flange is engaged in the hole of another flange when the upright members are engaged with one another. A respective pair of the integral flanges together define an end surface that is matingly engageable with another end surface of another respective pair of integral flanges in a manner such that the elongate opening is continuous with an elongate opening defined by an additional pair of upright members that together define the another respective pair of integral flanges.

4 Claims, 2 Drawing Sheets

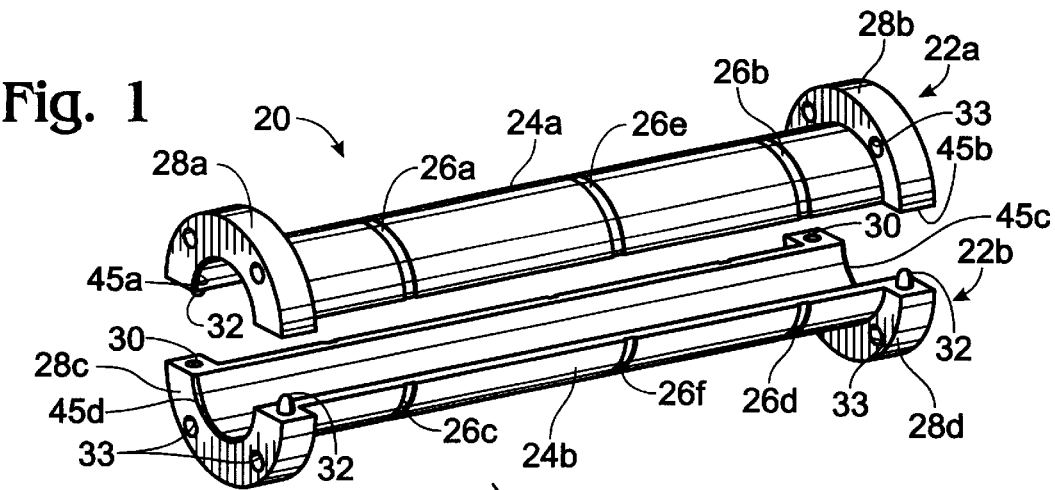
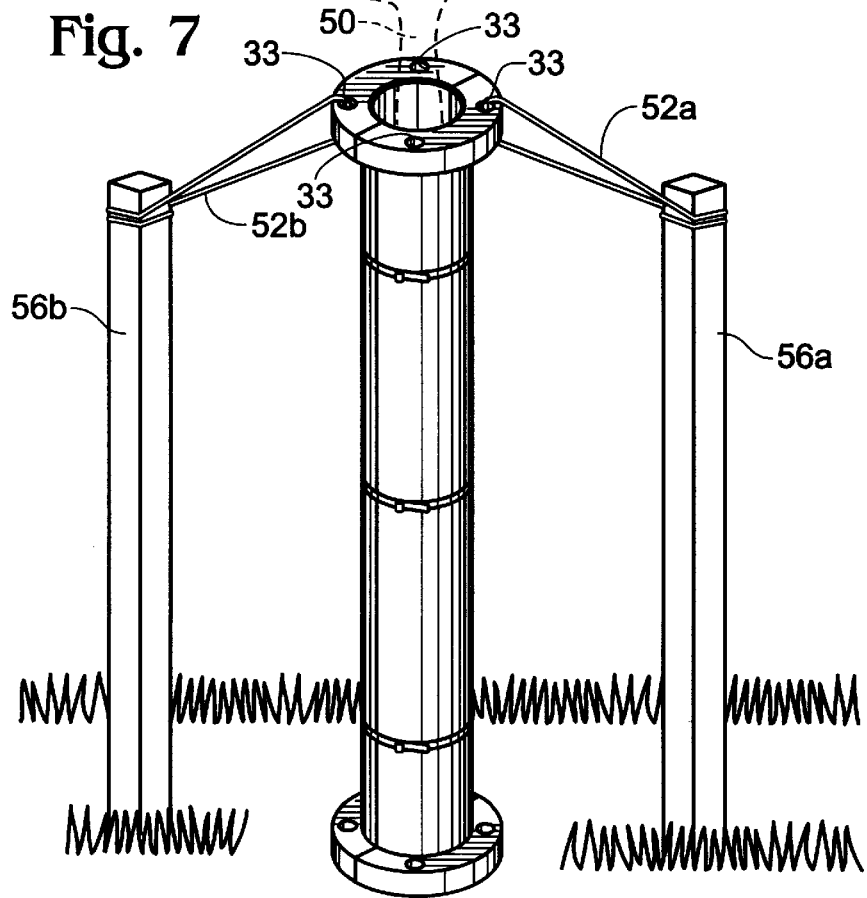

TREE TRUNK PROTECTOR

BACKGROUND OF THE INVENTION

The present invention relates to a tree trunk protector.

Many, if not most, homeowners, tree growers, and park administrators plant young trees. The current practice to protect the bark of young trees against both damage by animals and damage during general maintenance of the premises, involves using a solid piece of tubular plastic material, such as PVC pipe or a rubber hose, encircling the lower portion of the tree trunk. After the tree becomes sufficiently large and strong the tubular material is cut away.

Campbell, U.S. Pat. No. 5,048,229, discloses a device for surrounding a tree trunk that includes two or more vertical pieces joined together by two bottom locking pieces and two top locking pieces. Once the device is installed, it serves to safeguard the lower trunk of trees from bumps and cuts. However, the tree trunk protector disclosed by Campbell requires six interlocking pieces to maintain its position around the tree trunk and is somewhat complicated to assemble. Further, excessive jarring of Campbell's device results in the locking pieces becoming detached from the vertical pieces causing the tree trunk protector to fail.

Scarf, Sr., U.S. Pat. No. 4,268,992, discloses a tree protector that includes a hollow vertical shaft and an angular base disposed about the shaft, where both components are formed from connectable half sections. The base is provided with an annular trough and an inclined outer periphery. Hold down spikes are located within the trough to receive and dispense a watering medium into the adjacent ground. The protector disclosed by Scarf, Sr. is complicated, relatively expensive to manufacture, and the base prevents mowing or other activities adjacent to the trunk of the tree. Further the base is prone to being damaged from the wheels of farm vehicles.

Graves, U.S. Pat. No. 4,922,652, discloses a tree shelter that includes two parts joined by clips along a longitudinal axis. Each part comprises a funnel portion and a base portion. Each funnel portion is formed to allow the shelter to mimic the natural bending of a tree stem under the action of wind and is contoured internally to increase the area available for condensation and evaporation of moisture. Each base part is formed to restrict the growth of weeds around the base of the sheltered tree. Unfortunately, the base part is susceptible to damage from the wheels of farm vehicles. Also, the tree shelter does not permit one shelter to be stacked upon another to increase its overall effective height.

Kent, U.S. Pat. No. 574,998, discloses a fruit tree protector with a bell shaped lower end and a tubular portion where the diameter decreases toward the top. The tree protector disclosed by Kent is not suitable for stacking upon one another to increase its overall effective height. In addition, during windy days the tree protector fails to provide effective support to maintain the tree in an upright manner. Accordingly, trees are still susceptible to being blown over, together with the tree protector.

Whitlock, U.S. Pat. No. 44,131, discloses a tree protector that includes a cylinder with a flange at its bottom that is large enough to secure the cylinder in an upright position so as not to press or rub the bark of the tree. However, the tree trunk protector disclosed by Whitlock is not stackable upon one another, nor will it maintain the tree in an upright position if excessively windy.

What is desired, therefore, is a tree trunk protector that is simple to assemble, maintains the tree in an upright position even under severe environmental conditions, and is easily attachable and detachable to the trunk of a young tree.

SUMMARY OF THE INVENTION

The present invention overcomes the aforementioned drawbacks of the prior art by providing a tree trunk protector for protecting the lower portion of a tree. In one embodiment, the protector includes a pair of elongate upright members, each of which has opposing end portions. Each of the upright members defines a pair of upright edges such that respective pairs of the upright edges are engageable with one another to form an elongate opening suitable to surround the lower portion of the tree and the elongate opening is substantially the same size along the length of the upright members. Each end portion of each of the upright members defines a respective integral flange that includes a pair of faces where respective pairs of the faces are in face to face abutment when the upright edges are engaged with one another. Each of the faces of the integral flanges define a projection and a hole located such that the projection of one flange is engaged in the hole of another flange when the upright members are engaged with one another. A respective pair of the integral flanges together define an end surface that is matingly engageable with another end surface of another respective pair of integral flanges in a manner such that the elongate opening is continuous with an elongate opening defined by an additional pair of upright members that together define the another respective pair of integral flanges.

In another embodiment, the protector includes a pair of elongate upright members, each of which has opposing end portions. Each of the upright members defines a pair of upright edges such that respective pairs of the upright edges are engageable with one another to form an first elongate opening suitable to surround the lower portion of the tree. One end portion of each of the upright members defines a respective extension member such that the pair of extension members are engageable with one another to form a second elongate opening suitable to surround the lower portion of the tree. When the extension members are engaged with one another they define an exterior surface sized to fit within the first elongate opening of another tree trunk protector.

BRIEF DESCRIPTION OF THE DRAWINGS

FIG. 1 is a pictorial view of one embodiment of a tree trunk protector of the present invention.

FIG. 7 is a pictorial view of the tree trunk protector of FIG. 1 assembled around a tree.

DETAILED DESCRIPTION OF THE PREFERRED EMBODIMENT

Figure 2:
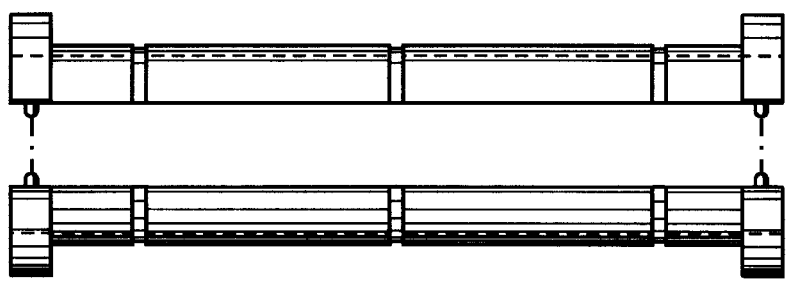
FIG. 2 is a side view of the tree trunk protector of FIG. 1, shown unassembled.

Referring to FIG. 1, the tree trunk protector 20 includes two identical halves 22a and 22b. Each half 22a and 22b includes an elongate tubular portion 24a and 24b, each of which defines respective recessed portions 26a, 26b, and 26c, 26d that receive a respective binding strap 40a and 40b to maintain both halves 22a and 22b together when assembled. Central recessed portions 26e and 26f receive a binding strap 40c. Flange portions 28a, 28b, 28c and 28d at the end of each tubular portion 24a and 24b project outwardly. Each of the flange portions 28a–28d includes a hole 30 and an oppositely disposed projection 32. The hole 30 and projection 32 are sized such that the projection 32 fits snugly within the hole 30 when assembled. The projection 32 and hole 30 on each of the respective flanges 29a–28d are in opposite relationship to each other such that when the two halves 22a and 22b are assembled they resist torquing motion.

Figure 3:
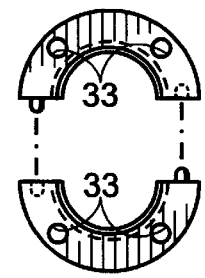
FIG. 3 is an end view of the tree trunk protector of FIG. 1, shown unassembled.
Figure 4:
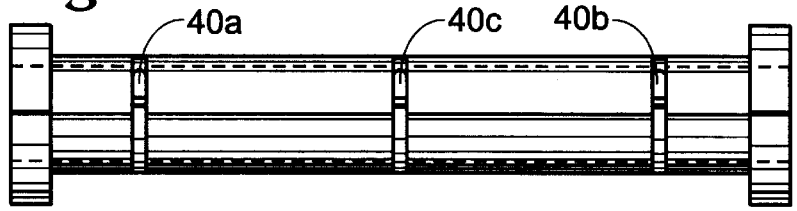
FIG. 4 is a side view of the tree trunk protector of FIG. 1, shown assembled.
Figure 5:
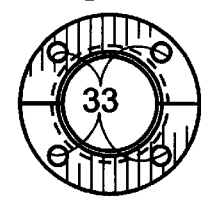
FIG. 5 is an end view of the tree trunk protector of FIG. 1, shown assembled.

Referring to FIGS. 2 and 3, to assemble the tree trunk protector 20 the respective projections 32 and holes 30 of the respective flanges 28a–28d are aligned with one another such that they mate with one another, as shown in FIGS. 4 and 5. After connecting the two halves 24a and 24b together, the straps 40a and 40b are connected to the two halves in the recessed portions 26a–26d to prevent the tree trunk protector 20 from becoming disassembled. Referring to FIG. 7, the tree trunk protector 20 is assembled with a tree trunk 50 therein and secured by the straps 40a and 40b. To disassemble the tree trunk protector 20 the straps 40a and 40b are cut or otherwise removed to allow the two halves 22a and 22b to become separated.

The tree trunk protector 20 may be any suitable size with an inner diameter that is preferably uniform along the length of the protector. As such the protector 20 is suitable for stacking on top of one another, as described later.

Figure 6:
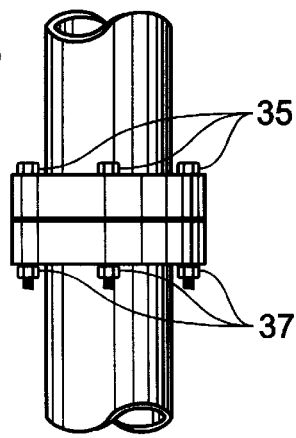
FIG. 6 is a side view of the pair of tree trunk protectors of FIG. 1 connected together.

Referring FIG. 6, each flange 28a–28d includes a pair of holes 33 that are located such that they are equally spaced when the tree trunk protector 20 is assembled. The flanges 28a–28d preferably include planar end surfaces that are perpendicular to the length of the tree trunk protector 20 such that one tree trunk protector 20 is easily stackable upon another tree trunk protector 20 and secured by bolts 35 and nuts 37. Alternatively, any suitable fastener may be used. As such, this permits a single tree trunk protector 20 with a given length to be stacked upon one another to construct an effective tree trunk protector of any suitable height for a particular tree. This minimizes the cost of providing tree trunk protectors of different lengths.

Referring again to FIG. 7, an assembled tree trunk protector 20 encircles the trunk 50 of a tree 54. The holes 30 in the flanges of the tree trunk protector 20 are connected to strings 52a and 52b and secured to posts 56a and 56b. As such, the top end of the tree trunk protector 20 secures the tree against movement during wind storms, animal attacks, or other disturbance of the tree. In addition, the interior of both halves 22a and 22b on both ends includes a beveled edge portion 45a–45d to protect the tree against being cut by movement of the tree trunk against the tree protector during severe weather. Alternatively, any number of strings may be used. Further, the strings may be connected directly to the ground or other nearby structures, such as another tree trunk protector 20.

Figure 8:
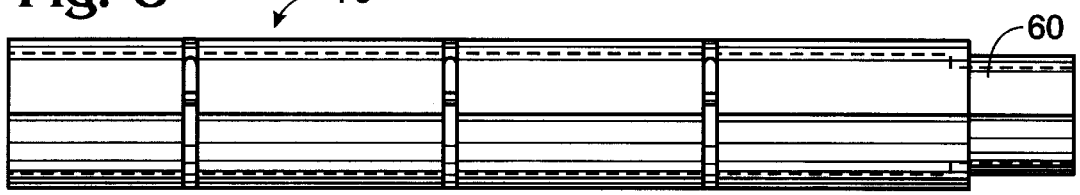
FIG. 8 is a side view of an alternative embodiment of a tree trunk protector.
Figure 9:
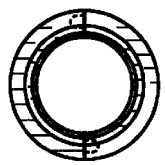
FIG. 9 is an end view of the tree trunk protector of FIG. 8, shown assembled.
Figure 10:
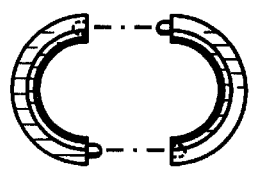
FIG. 10 is an end view of the tree trunk protector of FIG. 8, shown unassembled.
Figure 11:
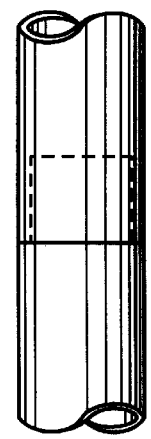
FIG. 11 is a side view of a pair of protectors of FIG. 8 connected together.

Referring to FIG. 8, an alternative embodiment of the tree trunk protector 70 includes a smaller tubular portion 60 on one end. As such, the smaller tubular portion 60 is sized to be inserted within the opposite end of another tubular portion, as shown in FIG. 11. The two halves of FIG. 8 are secured together in a manner similar to that of the tree trunk protector shown in FIG. 1. In addition, the stacking of multiple tubular portions, as shown in FIGS. 9 and 11, provides a strong interlocking mechanism that alleviates the need for bolts. Furthermore, flanges are not necessary for the alternative embodiment shown in FIG. 8, although they could be included, if desired.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A tree trunk protector for protecting the lower portion of a tree comprising:

(a) a pair of elongate upright members, each of which has opposing end portions;

(b) each of said upright members defining a pair of upright edges such that respective pairs of said upright edges are engageable with one another to form an elongate opening suitable to surround said lower portion of said tree;

(c) said elongate opening being of substantially the same size along the length of said upright members;

(d) each end portion of each of said upright members defining a respective integral flange each of which has a top surface and a bottom surface, and each integral flange defining an opening extending between respective pairs of said top and bottom surfaces and offset from said elongate opening;

(e) each of said integral flanges including a pair of faces, respective pairs of said faces being in face to face abutment when said upright edges are engaged with one another;

(f) each of said faces of said integral flanges defining a projection and a hole located such that said projection of one flange is engaged in said hole of another said flange when said upright members are engaged with one another; and (g) a respective pair of said integral flanges together defining an end surface that is matingly engageable with another end surface of another respective pair of integral flanges in a manner such that said elongate opening is continuous with an elongate opening defined by an additional pair of upright members that together define said another respective pair of integral flanges, and each said opening of each said integral flange is aligned with another respective opening defined by another flange of said another respective pair of integral flanges.

2. The protector of claim 1 wherein said end surface is perpendicular to said elongate opening.

3. The protector of claim 1 wherein said elongate opening is tubular and has the same diameter along the entire length of said elongate opening.

4. The protector of claim 1 wherein each of said upright members defines a recess around a portion of its exterior surface located such that when said upright members are engaged with one another each of said recesses are aligned with one another, and the protector further including a binding strap surrounding said pair of upright members located within said recesses.

* * * * *